Nov. 19, 1963 A. F. WORMSER ETAL 3,111,032
TEMPERATURE MEASUREMENT SYSTEM
Filed Dec. 7, 1961 5 Sheets-Sheet 1

INVENTORS
ALEXANDER F. WORMSER
EDWARD E. LYNCH
BY

Irving M. Freedman

THEIR ATTORNEY

Nov. 19, 1963  A. F. WORMSER ETAL  3,111,032
TEMPERATURE MEASUREMENT SYSTEM
Filed Dec. 7, 1961  5 Sheets-Sheet 5

INVENTORS
ALEXANDER F. WORMSER
EDWARD E. LYNCH
BY
Irving M. Freedman
THEIR ATTORNEY ated Nov. 19, 1963

3,111,032
TEMPERATURE MEASUREMENT SYSTEM
Alexander F. Wormser, Nahant, and Edward E. Lynch, Wakefield, Mass., assignors to General Electric Company, a corporation of New York
Filed Dec. 7, 1961, Ser. No. 157,729
19 Claims. (Cl. 73—359)

This invention relates to temperature measurement systems, and more particularly, to an improved system which will increase, by an order of magnitude, maximum temperatures which may be measured by direct reading sensors such as thermocouples and provide time constant indications of the sensors.

While radiation pyrometers have been used in the measurement of high temperatures, such instruments are relatively inaccurate if the emissivity or absorptivity of the target varies. Radiation pyrometers are also incapable of making localized temperature measurements, but instead indicate an average of the temperatures to which they are exposed. The use of radiation pyrometers is also limited since the output signal varies nonlinearly with temperature.

Direct reading temperature sensors located at the point under measurement, such as conventional thermocouples and resistance temperature detectors, overcome certain limitations of radiation pyrometers, but have the disadvantage of being limited in the temperature which may presently be measured because of deterioration and ultimately the melting of the sensor elements at high temperatures.

Accordingly, it is the object of the present invention to provide an improved temperature measurement system which increases the maximum temperature which may be measured with direct reading sensors, such as thermocouples, without melting, oxidation, sublimation, or other deterioration of the element.

Another object of the invention is to provide an improved temperature measurement system for use where the emissivity of the material under measurement is not accurately known.

Still another object of the invention is to provide an improved temperature measurement system which will increase the temperature that may be measured of a localized region.

Yet another object of the invention is to provide an improved temperature measurement system which does not involve the unknown radiation and conduction corrections of systems such as steady state thermocouple systems.

A further object of the invention is to provide an improved temperature measurement system which will increase the temperature range that may be measured by a single sensor without loss of accuracy due to nonlinear sensor characteristics.

A still further object of the invention is to provide an improved temperature measurement system which gives substantially instantaneous indications of variations of the temperature under measurement.

An additional object of the invention is to provide indications of the time constant of the sensor in a temperature measurement system.

Other objects of the invention will become apparent as the following description proceeds and the features of novelty which characterize the invention will be pointed out with particularity in the claims annexed to and forming a part of this specification.

In accordance with one form of the invention, a temperature sensor is periodically exposed to the gas, fluid, or material whose temperature is to be measured and then cooled before the sensor attains a sufficiently high and damaging temperature. Because of the thermal lag of the sensor, the sensor does not immediately reach the temperature to which it has been exposed, but approaches such temperature in a predetermined manner. Means are provided to determine the transient response of the sensor during the heating cycle and indicate the temperature under measurement by extrapolation of the transient response. An indicator provides a signal which varies as the measured temperature.

The cycle may be repeated as soon as the sensor has again attained a sufficiently low temperature, or whenever desired.

For a better understanding of this invention, reference may be had to the following description taken in connection with the accompanying drawings in which.

Figure 1:
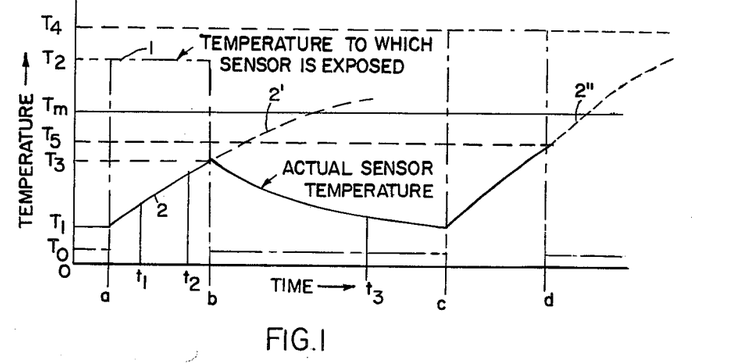
FIG. 1 is a plot of temperature versus time, useful in explaining the subject invention.

Referring to FIG. 1, there is shown a plot of the variation of temperature of a sensor such as a thermocouple when periodically subjected to a high temperature and then alternately to a relatively low temperature. The plot 1, illustrated by the dash and dot lines, is the temperature to which the direct reading sensor such as a thermocouple is subjected or exposed, while the plot 2 is the actual thermocouple temperature. At the time $a$, the thermocouple is exposed to the temperature under measurement $T_2$ for the period between time $a$ and $b$. The thermocouple temperature 2, because of the thermal time lag, will increase in a predetermined manner such as exponentially during the period $ab$ to the thermocouple temperature $T_3$. For the discussion below the response of the thermocouple 2 will be assumed as exponential. At time $b$, the thermocouple is no longer exposed to the temperature under measurement $T_2$ but is subjected to a cooling air or fluid flow having a temperature $T_0$ for the time period $bc$. Time $ac$ is one complete cycle of operation. If the thermocouple were not cooled after time $b$, its temperature would continue to rise exponentially, as shown by dotted curve $2'$, toward temperature $T_2$ until the thermocouple would melt or be damaged by exceeding its maximum operating temperature indicated as $T_M$. However, at time $b$, the thermocouple is exposed to the cooling temperature $T_0$ and the actual thermocouple temperature 2 decreases exponentially from $T_3$ toward $T_0$.

At time $c$, the cycle is repeated and the thermocouple is exposed to the temperature under measurement, which has by way of example, increased from $T_2$ to $T_4$. During the period $cd$ of exposure to the temperature $T_4$, the actual thermocouple temperature 2 rises exponentially to temperature $T_5$ at which time the cooling portion of the cycle causes the exponential cooling of the thermocouple rather than the continued temperature rise, the extension of which rise is indicated by curve $2''$.

Reference to FIG. 1 will show that the actual thermocouple temperature is maintained substantially below the critical or maximum temperature $T_M$. However, the actual thermocouple temperature 2 varies in a manner dependent upon the actual temperature 1 to which it is exposed.

Under conditions frequently encountered, a thermocouple responds to a step change in temperature in an exponential manner. Although not essential for the operation of the present device, it is nevertheless desirable that the thermocouple be designed in such a manner that its time temperature response is exponential. While the present invention is not limited to temperature sensors having exponential response characteristics, an exponential response will be assumed for purposes of simplicity and ease of explanation.

The time-temperature relationship of the thermocouple exhibiting a simple exponential response may be expressed for the period $ab$ by the following relationship:

$$T = T_1 + (T_2 - T_1)\left(1 - e^{-\frac{t}{\tau}}\right) \quad (1)$$

where, with reference to FIG. 1:

$T$ = temperature of the thermocouple at any time during the heating part of the cycle
$T_1$ = temperature of thermocouple at time $a$
$t$ = time the thermocouple has been exposed to temperature $T_2$
$\tau$ = thermocouple time constant
$e$ = Naperian constant = 2.718 . . .

The temperature time response need not be entirely exponential during periods other than the reading or sampling period as long as between $t_1$ and $t_2$, the reading period of FIG. 1, the sensor satisfies the one-dimensional heat transfer relationship of the following equation:

$$\tau\left(\frac{dT}{dt}\right) = (T_2 - T) \quad (2)$$

where:

$\left(\frac{dT}{dt}\right)$ = the instantaneous rate of temperature change of the thermocouple.

Figure 2:
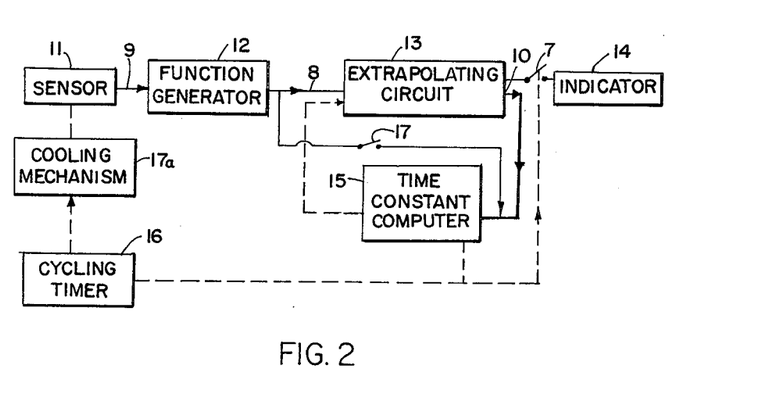
FIG. 2 is a block diagram of a temperature measurement system in accordance with the present invention.

Referring to FIG. 2, a system is shown in block diagram form which will provide the operation and results described in regard to FIG. 1. A timer 16 turns the cooling mechanism 17a off at time $a$ of FIG. 1 exposing the temperature sensor thermocouple 11 to the gas temperature under measurement. The thermocouple output voltage 9 is fed into function generator 12, which may be used with thermocouples whose temperature-versus-output-voltage relationship is not linear. The function generator 12 provides an output voltage 8 which is directly proportional to the instantaneous thermocouple temperature T. The function generator is not required for linear temperature transducers such as Chromel Alumel thermocouples.

The voltage output 8 of the function generator 12 is fed into the extrapolation or extrapolating circuit 13 to provide an output signal proportional to the gas temperature 1 to which the thermocouple is exposed.

At time $b$, the coolant is turned on. At time $t_1$, the switch 7 between extrapolation circuit 13 and indicator 14, is closed. The gas temperature to which the thermocouple is exposed is indicated on indicator 14. The reading is taken continuously until time $t_2$, when the indicator is disconnected by switch 7 being opened by cycling timer 16. At time $b$, the timer 16 restores power to the cooling mechanism to prevent the thermocouple from reaching the destructive temperature $T_m$. When time $c$ is reached, the timer repeats the cycle.

It is understood that the cycle may, in certain cases, be set by signals other than time. For example, the cycling switch may be turned on and off when the thermocouple reaches certain temperatures below $T_m$.

Figure 3:
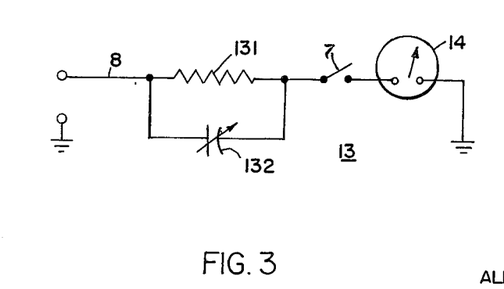
FIG. 3 is an extrapolation circuit using an ammeter indicator.

FIG. 3 shows in schematic form a suitable extrapolation circuit 13 for use in the arrangement of FIG. 2.

Referring to FIG. 3, a lead circuit is provided which will extrapolate the output of a linear exponential thermocouple. Since the voltage 8 is exponetial, if the numerical product of the series resistor 131 and its shunt capacitor 132 is made equal to the thermocouple time constant, then the current through the ammeter or indicator 14 will be constant during the reading period and directly proportional to the gas temperature.

Figure 4:
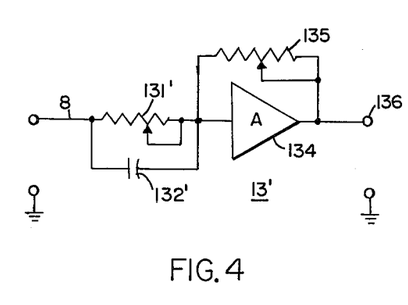
FIG. 4 is an extrapolation circuit using electronic components suitable for use in the block diagram of FIG. 2.

FIG. 4 is an alternate embodiment of an extrapolation circuit.

Referring to FIG. 4, the voltage signal 8 is fed to the parallel RC combination 131', 132' the values of which are determined by the same considerations discussed above in regard to FIG. 3. The output of the RC combination 131', 132' is fed through high gain operational amplifier 134 to the output terminal 136. The resistance of the feedback resistor 135 which connects between the output and the input of the operational amplifier 134 is preferably kept equal or proportional to the resistance of resistor 131'. The open loop gain of the operational amplifier 134 should be as high as practicable, $10^4$ to $10^9$, or better. If the RC time constant of resistor 131' and capacitor 132' is not equal to the time constant of the thermocouple 11, the output signal appearing at terminal 136 will vary with time and not be proportional to the temperature of the gas under measurement.

The circuit of FIG. 4 provides an amplified signal output. If the circuit of FIG. 3 is used rather than that of FIG. 4, the internal resistance of the ammeter 14 should be negligible in comparison with the resistance of resistor 131 in order to provide an output signal which does not vary with time. This requirement may limit the sensitivity of the ammeter. However, the circuit of FIG. 3 may be suitable if the reduced accuracy and performance is sufficient for the particular temperature measurement system.

Figure 5:
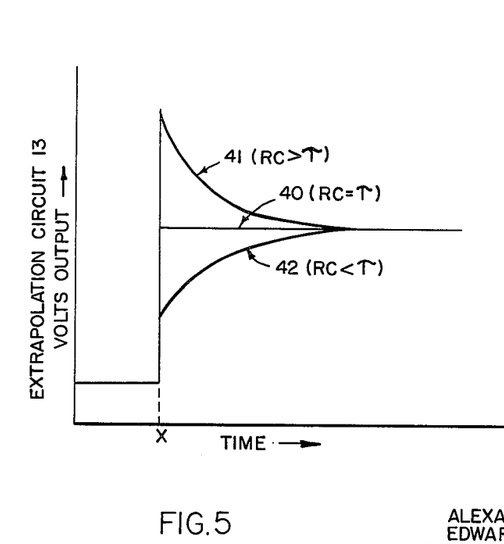
FIG. 5 is a plot useful in explaining the desired time constant relationship.

FIG. 5 is a plot of the output signal of the extrapolation circuit useful in explaining the desired time constant relationship. Referring to FIG. 5, when the thermocouple 11 is exposed to the gas under measurement the output voltage will quickly rise at time "X" to a value proportional to the temperature of the gas. If the RC time constant of resistor 131 and capacitor 132 is equal to the time constant of the thermocouple, and if the measured temperature $T_2$ is constant, the output voltage will not vary with time as indicated by curve 40, but instead will provide a steady output indication and/or output control signal. If the RC time constant is greater than that of the thermocouple, the output voltage as indicated by curve 41 will decrease with time in an exponential manner after attaining an initial value. Similarly, if the RC time constant is less than that of the thermocouple, the output voltage as indicated by curve 42 will increase with time in an exponential manner after attaining an initial value. However, in practice the time constant of the thermocouple 11 may be expected to vary during operation due to varying gas velocity, density, etc. It may be necessary to provide a time constant correction circuit. While the correction could be obtained by manually varying or adjusting resistor 131 or capacitor 132, in applications when the time constant of the thermocouple does not stay sufficiently constant and manual adjustment is not practical, an automatic time constant correction circuit should be provided. Such a circuit is shown as block 15 in the system block diagram of FIG. 2 and in detail in the schematic of FIG. 6.

Figure 6:
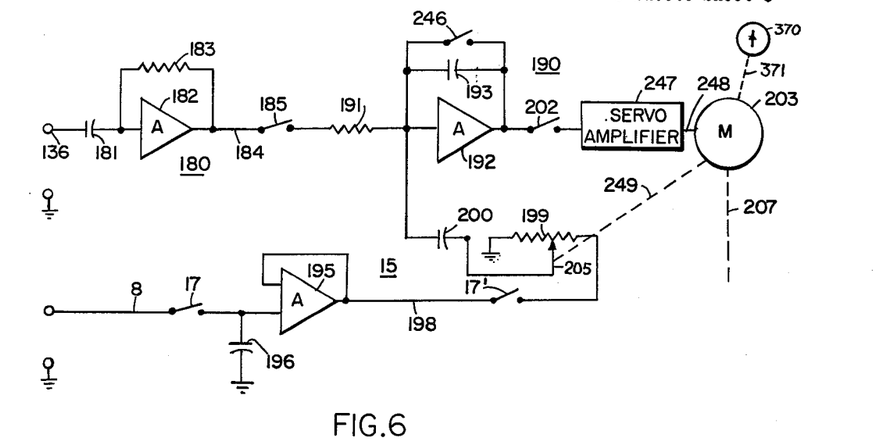
FIG. 6 is one circuit suitable for the determination of the sensor time constant.

Referring to FIGS. 2 and 6, it will be seen that the time constant correction circuit or computer 15 is connected between the output and the input of the extrapolation circuit 13. The output 136 of the extrapolation circuit 13 is fed to the differentiation circuit or differentiator 180 which includes series capacitor 181 and operational amplifier 182 shunted by feedback resistor 183. The output 184 of the differentiator circuit 180 is fed through switch 185, which is closed during the reading cycle $t_1 t_2$ by timer 16, to the integrator circuit 190. Integrator circuit 190 includes an input series resistor 191 and an operational amplifier 192 shunted by feedback capacitor 193.

Differentiator 180 determines the polarity and magnitude of the time constant error of FIG. 5. If the condition of $R_{131}C_{132} = \tau$ is met, the output of differentiator 180 is zero during time $t_1 t_2$. If $R_{131}C_{132} > \tau$, then the differentiator output is a negative and exponentially decaying quantity during $t_1 t_2$. Similarly, if $R_{131}C_{132} < \tau$, then the differentiator output is positive and an exponentially decaying quantity during $t_1 t_2$. Integrator 190 reduces the noise level that exists at the output of differentiator 180. If the integrator signal, rather than the differentiator signal, is fed into the time constant correction motor, the resulting operation is more stable.

The output of the integrator circuit 190 is connected through switch 202 to the servo amplifier 247 and then to a two-phase servo motor 203. Switch 202 is closed by timer 16 to drive motor 203 only during the thermocouple cooling period $bc$. Servo amplifier 247 provides an alternating current output signal 248, the amplitude of which is proportional to the output of integrator 190 and the phase of which is determined by the polarity of the integrator output.

Another input to the time constant correction circuit 15 is derived from the output signal 8 of the function generator 12. The signal 8 is fed through switch 17 which is closed during the heating cycle $t_1 t_2$ by timer 16 to the operational amplifier 195 having capacitor 196 across the input thereof. The output signal 198 of the operational amplifier 195 is fed through switch 17' and a series RC circuit comprising variable resistor 199 and capacitor 200 to the input of operational amplifier 192 of the integrator circuit 190. Switch 17' is opened when switch 17 is closed, and vice versa.

The output shaft 207 of motor 203 is coupled to the potentiometers 131' and 135 of the extrapolation circuit 13' to automatically make $R_{131}'C_{132}'$ equal to the thermocouple time constant $\tau$. If FIG. 3 is used $C_{132}$ is varied by shaft 207.

The servo motor 203 is preferably driven during the cooling portion of the cycle $bc$ in order to avoid instability in the time constant correction circuit which would otherwise exist if the correction is made during the heating cycle $ab$. The output of the integrator 190 is reduced to zero by means of shorting switch 246 being closed by timer 16 late in the cooling cycle from $t_3$ to $c$ in FIG 1. This eliminates instability in the time constant correction circuit. Switch 246 discharges capacitor 193 and is actuated by cycling timer 16.

It is to be noted that the angular position of motor 203 after attaining equillibrium is related to the magnitude of the time constant $\tau$ which can be indicated by an indicator 370 geared to the motor shaft by gearing 371. This information is useful in applications such as the calibration of heat transfer stands. Since the turbulence of fluid streams affects the heat transfer and sensor time constant in measurement systems associated with the streams, the variations in time constant may be utilized as an indication of variations in turbulence.

An alternative to shorting switch 246 which permits time constant correction in fewer cycles than the above method may be accomplished by a motor feedback arrangement. With such an arrangement switch 246 is omitted and the motor 203 is mechanically coupled by coupling 249 to the wiper 205 of the variable resistor 199 to provide regenerative feedback which helps stop the motor 203 at the correct position.

Figure 7:
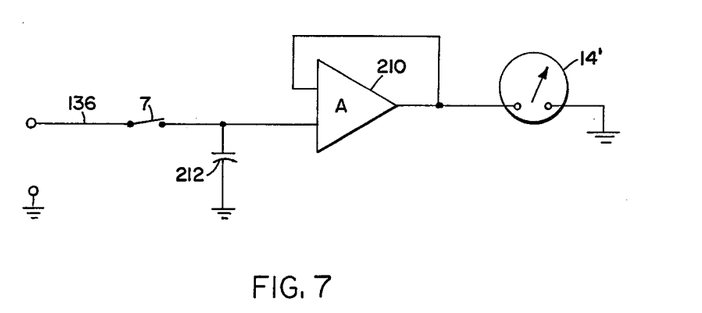
FIG. 7 is an indicating circuit suitable for use in conjunction with FIG. 4.

FIG. 7 shows an alternate embodiment of the indicating circuit. Referring to FIG. 7, the output signal 136 of the extrapolating circuit 13 is fed through switch 7 to the operational amplifier 210. The switch 7 is closed by the timer 16 only during the reading portion $t_1 t_2$ of the cycle. A capacitor 212 is connected between the input of the amplifier 210 and ground while a voltmeter or indicator 14' is connected across the output. The signal 136, from extrapolating circuit 13, charges capacitor 212 in accordance with the temperature $T_2$ to which the thermocouple 11 is exposed. This voltage is reproduced without leaking off at the output of the operational amplifier and shown by indicator 14'. Thus, the indicator 14' indicates, during the cooling period, the temperature to which the thermocouple was subjected during the previous heating period of the cycle.

Figure 8:
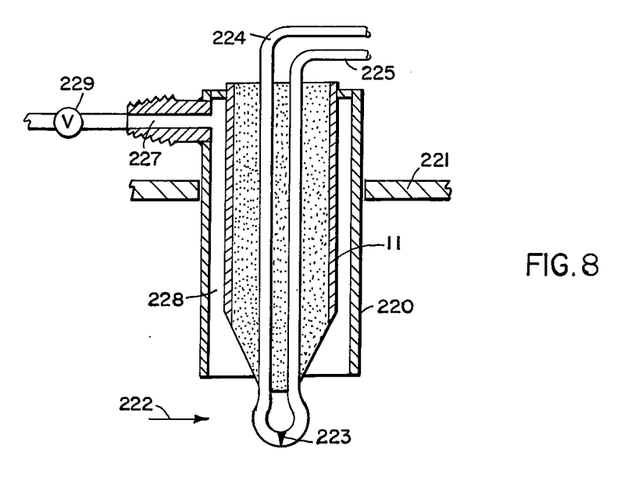
FIG. 8 shows one embodiment of a suitable cooling system.

The cyclic heating and cooling of the sensor or thermocouple 11 may be accomplished by motion of the thermocouple, control of the cooling flow, control of the gas flow under measurement, control of a protecting shield, or a combination of such means. In the arrangement shown in FIG. 8, the thermocouple 11, positioned within a surrounding housing 220, extends through the wall 221 of a housing containing the gas flow under measurement indicated by arrow 222. The thermocouple junction 223 is exposed to the gas flow and provides an output voltage 8 across leads 224 and 225 which varies in accordance with the temperature to which the junction 223 is exposed. Cooling air or other medium is caused to flow through the passageway 227 and the annular space 228 between the thermocouple 11 and housing 220 past the thermocouple junction 223. The cooling gas flow is relatively small compared to the gas flow 222 under measurement and has negligible effect on the operation of the equipment whose temperature is being measured. The timed flow of the cooling medium is controlled by the timer 16 connected to solenoid valve 229 in the passageway 227. Thus, the thermocouple 11 is exposed only to the gas under measurement when the solenoid valve 229 is closed and is cooled by the cooling medium when the solenoid valve is open as determined by the timer 16.

Figure 9:
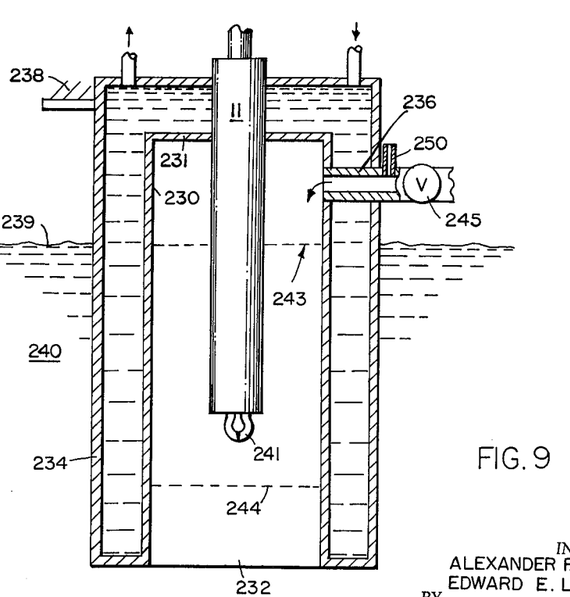
FIG. 9 shows an alternate cooling system.

FIG. 9 illustrates an alternate embodiment of a cyclic heating and cooling which is better adapted to the measurement of liquids such as molten steel. Referring to FIG. 9, the thermocouple 11 is positioned within an inner housing 230 through the upper end closure member 231. The bottom end 232 is open. An outer sealed housing 234 encloses the inner housing 230 forming a jacket into which cooling water may be continuously passed. A coolant air pipe 236 extends through both the outer housing 234 and the inner housing 230 to allow coolant air to be admitted to the region between the thermocouple 11 and the inner housing 230. Gas and water-tight seals are provided where the pipe 236 passes through the housings. A solenoid valve operated by timer 16 enables selectively controlled cycling of the coolant air. The entire assembly is supported by support means 238 so that the assembly projects far enough below the level 239 of the molten steel 240 under measurement so that the thermocouple junction 241 is below the level 239. It is to be noted that the lower end of inner housing 230 and the outer housings 234 extend below the thermocouple junction 241.

The molten steel will rise through the open bottom 232 of the inner housing 234 to a level, such as 243, to surround the thermocouple junction during the heating cycle $ab$ of FIG. 1. At time $b$, the timer 16 energizes solenoid valve 245 in the coolant air pipe 236 admitting coolant air or a nonoxidizing gas to the region between the thermocouple 11 and inner housing 230 to force the molten steel down to a level 244 below the thermocouple junction 241.

The molten steel is cooled during the cooling period by radiation to the water-cooled jacket and by convection to the coolant air. At the end of the cooling cycle the solenoid 245 is returned to its original position permitting the air to bleed to the atmosphere through a dump port or vent 250 which may be part of, or controlled by, valve 245. This allows the molten steel to again rise past the level 243 to surround the thermocouple junction 241.

Figure 6A:
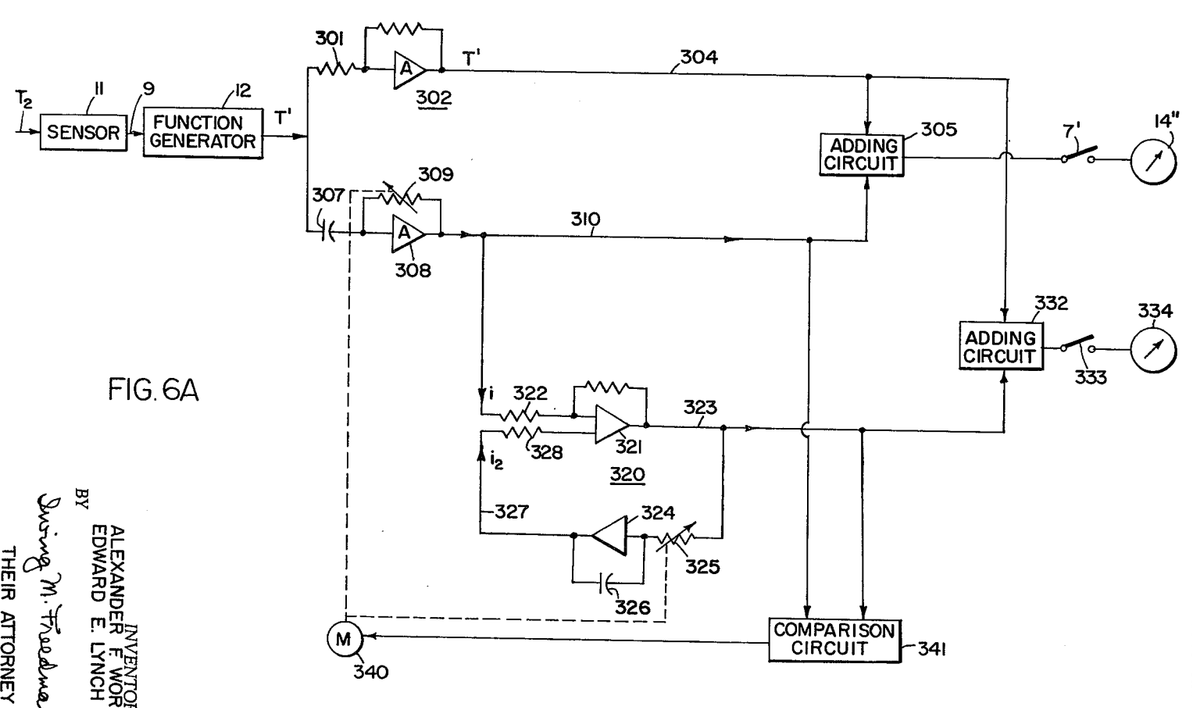
FIG. 6A is an alternate circuit suitable for the determination of the sensor time constant.

FIG. 6A illustrates an alternate sensor time constant circuit utilizing a double differentiation arrangement.

Referring to FIG. 6A, it will be seen that the temperature $T_2$ to which the sensor 11 is exposed provides a voltage or signal 9 which, if the sensor is not linear, is fed to the function generator 12 to provide a signal $T'$ which is directly proportional to the instantaneous thermocouple temperature.

The signal $T'$ is fed through series resistor 301 to amplifier 302 where it may be amplified and then fed through lead 304 to the adding circuit or network 305. The signal $T'$ is also fed through a capacitor 307 as a part of the differentiator 308. A resistor 309 shunts in the amplifier as part of the differentiator 308 and in combination with capacitor 307 provides a time constant $\tau'$ which is equal to the sensor 11 time constant $\tau$. The output signal 310 of the differentiator 308 may be expressed:

$$e_{310} = \tau' \dot{T}' \quad (3)$$

where $$\dot{T}' = \frac{dT'}{dt}$$

Signal 310 is fed to the other input of the adding circuit 305 to provide an output signal through switch 7' which indicates at indicator 14" the temperature $T_2'$ in accordance with the following relationship:

$$T_2' = T' + \tau' \dot{T}' \quad (4)$$

Signal 310 is also differentiated again by a network 320 employing the known technique of differentiation through use of a feedback integrator. Differentiation network 320 includes a comparing amplifier 321 having as one input the signal 310 fed through resistor 322. The output 323 of the comparing amplifier is fed back through integrator 324 which includes series resistor 325 in its input and which includes the shunt of a capacitor 326. The output integrated signal 327 of integrator 324 is fed back through series resistor 328 to the other input of comparing amplifier 321.

The differentiator 320 employing the feedback integration is more stable than the more conventional differentiating circuit 308. The comparing amplifier 321 provides a changing difference output until the current $i_2$ through input resistor 328 equals the current $i$ through resistor 322.

The output signal 323 of the second differentiator 320 may be expressed:

$$\text{Output} = (\tau')^2 \ddot{T}' \quad (5)$$

where $$\ddot{T}' = \frac{d^2 T'}{dt^2}$$

The signal 323 is fed to one input of an adding circuit 332 while the signal 304 or $T'$ is fed to the other input to provide an output signal through switch 333 to indicator 334 which may be expressed:

$$T_2' = T' + \tau'^2 \ddot{T}' \quad (6)$$

At a constant temperature to be measured the temperature $T_2$ to which the sensor 11 is exposed may be expressed as follows:

$$T_2 = T + \tau \dot{T} = T + (\tau)^2 \ddot{T} \quad (7)$$

By making the time constants $\tau'$ of the differentiators equal to that of sensor 11 the indications provided by 14" and 334 will be the same. However, if the measurement time constants do not correspond to the sensor time constant, the readings will differ an amount corresponding to the amount that $\tau'$ should be changed. This change may be accomplished manually by varying resistors 309 and 325 or capacitors 307 and 326 or it may be accomplished automatically by a motor 340 which, as shown in FIG. 6A, is energized by the output of comparison circuit 341 which compares the signals 310 and 323.

While differentiation beyond the second order may be used, it is well known that differentiators introduce noise. The differentiator of the type shown as 320 employing feedback integration is preferred because it reduces the noise generated.

While the time constant circuit of FIG. 6 is preferable for most applications, the double differentiation arrangement of FIG. 6A may prove advantageous for certain applications since the time constant correction can readily be accomplished during the heating portion $ab$ of the cycle shown in FIG. 1.

Although the invention has been described as applied to a measurement system for extending the maximum positive temperature which can be measured with a direct reading sensor, it should be appreciated that it can also be utilized to extend the maximum negative temperature which can be measured. In such cases the sensor will alternately be exposed to the "cold" temperature and then heated to avoid problems of sensor characteristics encountered toward absolute zero temperature. The heating may be accomplished by any of many ways; such as, by cyclically passing a heating current through the sensor, cyclically passing current through a heating element located proximate to the sensor, or cyclically venting a heating medium past the sensor in the manner shown in FIGS. 8 and 9. The cycling timer 16 would control the heating mechanism which would replace 17a in FIG. 2.

The response of the output of systems constructed in accordance with the invention quickly follows variations in the temperature under measurement since the time constant of the sensor is avoided. In applications where a change of temperature is indicative of a fault or trouble, the subject invention may be utilized to provide substantially instantaneous indications of such variations.

The time constant indication provided by indicator 370 can be obtained whether the sensor is heated or cooled relative to its actual temperature, which actual temperature can be a very high or a very low temperature. In obtaining time constant indications it is only necessary to modify or change, such as by a step change, the temperature of the sensor and note the indication provided by indicator 370 in response thereto.

While the invention has been described in regard to temperature measurement systems utilizing thermocouples, it should be appreciated that it is applicable to other types of sensors, such as a resistance temperature detector, bolometer, gas-filled thermometer, vapor-filled thermometer, or bimetal thermometer. Also, the object or target whose temperature to be measured may be gaseous, liquid, or solid, and that heat transfer from the target to the sensor may be by convection or by radiation, or both.

If the sensor response differs from the simple exponential of Equation 1, the extrapolation circuits of FIGS. 3 and 4 may be replaced by known computer techniques.

It is also understood that differentiation, integration, and addition may be performed approximately and without use of amplifiers.

Therefore, while particular embodiments of the subject invention have been shown and described herein, they are in the nature of description rather than limitation, and it will occur to those skilled in the art that various changes, modifications, and combinations may be made within the province of the appended claims without departing either in spirit or scope from this invention in its broader aspects.

What we claim as new and desire to secure by Letters Patent of the United States is:

1. A temperature measurement system for extending the useful range of a temperature sensor such as a thermocouple comprising a temperature sensor to provide an output signal in accordance with its temperature, means to cool said sensor, means for cycling said cooling means to provide periods of exposure of the sensor to the temperature under measurement and periods of cooling of the sensor, and means to extrapolate the transient response of the sensor to indicate the temperature under measurement, whereby the maximum temperatures measurable with said sensor are increased.

2. A temperature measurement system for extending the useful range of a temperature sensor such as a thermocouple comprising a temperature sensor to provide an output signal in accordance with its temperature, said temperature sensor having a time constant due to its response when alternately heated and cooled means to cool said sensor, means for cycling said cooling means to provide periods of exposure of the sensor to the temperature under measurement and periods of cooling of the sensor, means to extrapolate the transient response of the sensor to indicate the temperature under measurement, said extrapolating means comprising a circuit having a time constant, and means to compensate for variations of the time constant of said extrapolating means from said sensor time constant, whereby the maximum temperatures measurable with said sensor are increased.

3. A temperature measurement system for extending the useful range of a temperature sensor such as a thermocouple comprising a temperature sensor to provide an output signal in accordance with its temperature, said temperature sensor having a time constant due to its response when alternately heated and cooled means to cool said sensor, means for cycling said cooling means to provide periods of exposure of the sensor to the temperature under measurement and periods of cooling of the sensor, means to extrapolate the transient response of the sensor to provide a second signal which varies as the temperature under measurement, said extrapolating means comprising a circuit having a time constant, and means to compensate for variations of the time constant of said extrapolating means from said sensor time constant, said compensation means including means to differentiate said second signal, whereby the maximum temperatures measurable with said sensor are increased.

4. A temperature measurement system for extending the useful range of a temperature sensor such as a thermocouple comprising a temperature sensor to provide an output signal in accordance with its temperature, said temperature sensor having a time constant due to its response when alternately heated and cooled means to cool said sensor, means for cycling said cooling means to provide periods of exposure of the sensor to the temperature under measurement and periods of cooling of the sensor, means to extrapolate the transient response of the sensor to provide a second signal which varies as the temperature under measurement, said extrapolating means comprising a circuit having a time constant, and means to compensate for variations of the time constant of said extrapolating means from said sensor time constant, said compensation means including means to differentiate said second signal, and means to integrate said differentiated signal, whereby the maximum temperatures measurable with said sensor are increased.

5. A temperature measurement system for extending the useful range of a temperature sensor such as a thermocouple comprising a temperature sensor to provide an output signal in accordance with its temperature, said temperature sensor having a time constant due to its response when alternately heated and cooled means to cool said sensor, means for cycling said cooling means to provide periods of exposure of the sensor to the temperature under measurement and periods of cooling of the sensor, means to extrapolate the transient response of the sensor to provide a second signal which varies as the temperature under measurement, said extrapolating means comprising a circuit having a time constant, and means to compensate for variations of the time constant of said extrapolating means from said sensor time constant, said compensation means including means to differentiate said second signal, and means to integrate said differentiated signal to provide an integrated signal, said differentiation and integration being accomplished during the period of exposure of said sensor to the temperature under measurement, said integrated signal being utilized to provide said compensation during the cooling portion of the cycle, whereby the maximum temperatures measurable with said sensor are increased.

6. A temperature measurement system for extending the useful range of a temperature sensor such as a thermocouple comprising a temperature sensor to provide an output signal in accordance with its temperature, said temperature sensor having a time constant due to its response when alternately heated and cooled means to cool said sensor, means for cycling said cooling means to provide periods of exposure of the sensor to the temperature under measurement and periods of cooling of the sensor, means to extrapolate the transient response of the sensor to provide a second signal which varies as the temperature under measurement, said extrapolating means comprising a circuit having a time constant, and means to compensate for variations of the time constant of said extrapolating means from said sensor time constant, said compensation means including means to differentiate said second signal, said differentiation being accomplished during the period of exposure of said sensor to the temperature under measurement, and said compensation being effected during the heating of said sensor, whereby the maximum temperatures measurable with said sensor are increased.

7. A temperature measurement system for extending the useful range of a temperature sensor such as a thermocouple comprising a temperature sensor to provide an output signal in accordance with its temperature, means to cool said sensor, means for cycling said cooling means to provide periods of exposure of the sensor to the temperature under measurement and periods of cooling of the sensor, and means to indicate the temperature under measurement, whereby the maximum temperatures measurable with said sensor are increased, said cycling means including means to cyclically cause a cooling fluid to flow past said temperature sensor.

8. A temperature measurement system for extending the useful range of a temperature sensor such as a thermocouple comprising a temperature sensor including a temperature responsive portion to provide an output signal in accordance with its temperature, means to cool said sensor, means for cycling said cooling means to provide periods of exposure of the sensor to the temperature under measurement and periods of cooling of the sensor, and means to indicate the temperature under measurement, whereby the maximum temperatures measurable with said sensor are increased, said cycling means including a housing surrounding said sensor, means to position said sensor and housing in a fluid whose temperature is to be measured such that the fluid fills the region between said sensor and housing to a level above the temperature responsive portion during said exposure to the temperature under measurement, and means to introduce a fluid to said region to cause the fluid under measurement to move below said temperature responsive portion during said cooling period.

9. A temperature measurement system for extending the useful range of a temperature sensor such as a thermocouple comprising a temperature sensor including a temperature responsive portion to provide an output signal in accordance with its temperature, means to cool said sensor, means for cycling said cooling means to provide periods of exposure of the sensor to the temperature under measurement and periods of cooling of the sensor, and means to indicate the temperature under measurement, whereby the maximum temperatures measurable with said sensor are increased, said cycling means including a housing surrounding said sensor, means to position said sensor and housing in a fluid whose temperature is to be measured such that the fluid fills the region between said sensor and housing to a level above the temperature responsive portion during said exposure to the temperature under measurement, and means to introduce a fluid to said region to cause the fluid under measurement to move below said temperature responsive portion during said cooling period, said housing having hollow walls which are fluid cooled.

10. A temperature measurement system for extending the useful range of a temperature sensor such as a thermocouple comprising a temperature sensor which provides an output signal which varies nonlinearly in accordance with its temperature, means to cool said sensor, means for cycling said cooling means to provide periods of exposure of the sensor to the temperature under measurement and periods of cooling of the sensor, a function generator to convert said output signal to a second signal which varies linearly with the sensor temperature, and means to extrapolate the transient response of said second signal to indicate the temperature under measurement, whereby the maximum temperatures measurable with said sensor are increased.

11. A temperature measurement system for extending the useful range of a temperature sensor such as a thermocouple comprising a temperature sensor to provide an output signal in accordance with the temperature to which it is exposed, means to cool said sensor, means for cycling said cooling means to provide periods of exposure of the sensor to the temperature under measurement and periods of cooling of the sensor, means to extrapolate the transient response of the sensor to provide a signal which varies as the temperature under measurement and an indicator to indicate the temperature under measurement, and a switch to selectively connect said indicator to said extrapolating means during the period of exposure of the sensor to the temperature under measurement, whereby the maximum temperatures measurable with said sensor are increased.

12. A temperature measurement system for extending the useful range of a temperature sensor such as a thermocouple comprising a temperature sensor to provide an output signal in accordance with the temperature to which it is exposed, means to cool said sensor, means for cycling said cooling means to provide periods of exposure of the sensor to the temperature under measurement and periods of cooling of the sensor, means to extrapolate the transient response of the sensor to provide a signal which varies as the temperature under measurement and an indicator to indicate the temperature under measurement, a switch to selectively connect said indicator to said extrapolating means during the period of exposure of the sensor to the temperature under measurement, and means interposed between said switch and said indicator to store said extrapolated signal during the cooling period, whereby the maximum temperatures measurable with said sensor are increased.

13. A temperature measurement system for extending the useful range of a temperature sensor such as a thermocouple comprising a temperature sensor to provide an output signal in accordance with its temperature, means to heat said sensor, means for cycling said heating means to provide periods of exposure of the sensor to the temperature under measurement and periods of heating of the sensor, and means to extrapolate the transient response of the sensor to indicate the temperature under measurement, whereby lower temperatures may be measured with said sensor.

14. A temperature measurement system for extending the useful range of a temperature sensor such as a thermocouple comprising a temperature sensor to provide an output signal in accordance with its temperature, said temperature sensor having a time constant due to its response when alternately heated and cooled, means to heat said sensor, means for cycling said heating means to provide periods of exposure of the sensor to the temperature under measurement and periods of heating of the sensor, means to extrapolate the transient response of the sensor to provide a second signal which varies as the temperature under measurement, said extrapolating means comprising a circuit having a time constant, and means to compensate for variations of the time constant of said extrapolating means from said sensor time constant, whereby lower temperatures may be measured with said sensor.

15. A temperature measurement system for extending the useful range of a temperature sensor such as a thermocouple comprising a temperature sensor to provide an output signal in accordance with its temperature, said temperature sensor having a time constant due to its response when alternately heated and cooled means to heat said senor, means for cycling said heating means to provide periods of exposure of the sensor to the temperature under measurement and periods of heating of the sensor, means to extrapolate the transient response of the sensor to provide a second signal which varies as the temperature under measurement, said extrapolating means comprising a circuit having a time constant, and means to compensate for variations of the time constant of said extrapolating means from said sensor time constant, said compensation means including means to differentiate said second signal, whereby lower temperatures may be measured with said sensor.

16. A temperature measuring system for extending the useful range of a temperature sensor such as a thermocouple comprising a temperature sensor to provide an output signal in accordance with its temperature, said temperature sensor having a time constant due to its response when alternately heated and cooled, means to cool said sensor, means for cycling said cooling means to provide periods of exposure of the sensor to the temperature under measurement and periods of cooling of the sensor, a first means to extrapolate the transient response of the sensor to provide a second signal which varies as the temperature under measurement, said extrapolating means comprising a circuit having a time constant, so that said second signal also varies as a function of the time constant of said extrapolating means, a second means to extrapolate the transient response of the sensor to provide a third signal which varies as the temperature and also varies as a different function of the same time constant, means for comparing said second and third signals, and means for varying said time constant of said first extrapolating means until it is equal with the time constant of said sensor, whereby the maximum temperatures measurable with said sensor are increased.

17. For use in a temperature measurement system: A temperature sensor to provide an output signal in accordance with its temperature, said temperature sensor having a time constant due to its response when alternately heated and cooled means, to subject said sensor to a modifying temperature, means for cycling said first named means to provide periods of exposure of the sensor to the temperature under measurement and periods of exposure to the modifying temperature, means to extrapolate the transient response of the sensor to provide a second signal which varies as the time constant of said sensor and an indicator responsive to said second signal to indicate the time constant of the sensor.

18. In a temperature measurement system: a temperature sensor to provide an output signal in accordance with its temperature, means to modify the temperature of said sensor, said temperature sensor having a time constant due to its response when alternately heated and cooled, means for cycling said modifying means to provide periods of exposure of the sensor to the temperature under measurement and periods of exposure to the modifying temperature, means to extrapolate the transient response of the sensor to indicate the temperature under measurement, said extrapolating means comprising a circuit having a time constant, and means to compensate for variations of the time constant of said extrapolating means from said sensor time constant, whereby variations in the temperature under measurement are rapidly indicated.

19. In a temperature measurement system: a temperature sensor to provide an output signal in accordance with its temperature, means to modify the temperature of said sensor, said temperature sensor having a time constant due to its response when alternately heated and cooled, means for cycling said modifying means to provide periods of exposure of the sensor to the temperature under measurement and periods of exposure to the modifying temperature, means to extrapolate the transient response of the sensor to provide a second signal which varies as the temperature under measurement, said extrapolating means comprising circuit having a time constant, and means to compensate for variations of the time constant of said extrapolating means from said sensor time constant, said compensation means including means to differentiate said second signal, whereby variations in the temperature under measurement are rapidly indicated.

References Cited in the file of this patent

UNITED STATES PATENTS

| | | |
|---|---|---|
| 3,045,487 | Raezer | July 24, 1962 |
| 3,080,755 | Percy | Mar. 12, 1963 |